(12) United States Patent
Mozdy et al.

(10) Patent No.: US 6,819,846 B2
(45) Date of Patent: Nov. 16, 2004

(54) HIGH ABSORPTION ERBIUM DOPED AMPLIFYING OPTICAL FIBER

(75) Inventors: Rachel S. Mozdy, Elmira, NY (US); Atul D. Pradhan, Elmira, NY (US); Frances M. Smith, Horseheads, NY (US); William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 277 days.

(21) Appl. No.: 10/206,663

(22) Filed: Jul. 26, 2002

(65) Prior Publication Data

US 2003/0035638 A1 Feb. 20, 2003

Related U.S. Application Data

(60) Provisional application No. 60/309,606, filed on Aug. 2, 2001.

(51) Int. Cl.$^7$ .................................................. G02B 6/16
(52) U.S. Cl. .................. 385/123; 359/341.1; 359/341.5
(58) Field of Search ................................ 385/123, 124, 385/125, 126, 127; 359/341.1, 341.5

(56) References Cited

U.S. PATENT DOCUMENTS

| | | |
|---|---|---|
| 4,330,628 A | 5/1982 | Cockram et al. |
| 4,345,037 A | 8/1982 | Fyles et al. |
| 4,366,251 A | 12/1982 | Rapp |
| 4,461,840 A | 7/1984 | Massol et al. |
| 4,530,909 A | 7/1985 | Makishima et al. |
| 4,534,796 A | 8/1985 | Massol |
| 4,552,850 A | 11/1985 | Partington et al. |
| 4,575,493 A | 3/1986 | Rauch, Sr. |
| 4,709,987 A | 12/1987 | Blackburn et al. |
| 4,713,359 A | 12/1987 | Lubelski et al. |
| 4,923,279 A * | 5/1990 | Ainslie et al. ............... 385/127 |

(List continued on next page.)

FOREIGN PATENT DOCUMENTS

| | | |
|---|---|---|
| EP | 0469795 A1 | 2/1992 |
| EP | 1091461 A1 | 4/2001 |
| EP | 1207597 A1 | 5/2002 |
| WO | WO 01/39339 A1 | 5/2001 |

OTHER PUBLICATIONS

Massicott et al., "Efficient, High Power, High Gain, $Er^{3+}$ Doped Silica Fibre Amplifier," Electronics Letters, Jul. 5, 1990, vol. 26, No. 14, pp. 1038–1039.

Kagi et al., "Gain Characteristics of $Er^{3+}$ Doped Fiber with Quasiconfined Structure," Optical Fiber Communication Conference, 1990, Technical Digest Series, vol. 1, Conference Edition, Friday Morning, 10:45 AM, Paper FA8.

*Primary Examiner*—Phan T. H. Palmer
*Assistant Examiner*—Jennifer Doan
(74) *Attorney, Agent, or Firm*—Svetlana Z. Short

(57) ABSTRACT

An optical waveguide fiber amplifier comprising a core region comprises at least in part between 1300 wt.ppm and 3600 wt.ppm $Er_2O_3$, between 6.0 wt. % to 10.0 wt. % $Al_2O_3$ and between 9.0 wt. % and 20.0 wt. % $GeO_2$. The amplifier also comprising an inner clad surrounding the core region and an outer clad surrounding the inner clad. The relative refractive index percentages and radii of the core region, inner clad and outer clad are chosen from the following ranges: the relative refractive index percent of the core segment within the range of from about 0.5% to about 2.0%; the relative refractive index percent of the inner clad within the range of from about 0.0% to about 0.4%; the outer radius of the core region within the range of from about 0.7 $\mu$m to about 1.5 $\mu$m; and, the outer radius of the inner clad within the range of from about 4.3 $\mu$m to about 18.8 $\mu$m.

28 Claims, 2 Drawing Sheets

U.S. PATENT DOCUMENTS

| | | | |
|---|---|---|---|
| 4,929,387 A | 5/1990 | Hayden et al. | |
| 5,005,175 A | * 4/1991 | Desurvire et al. | 372/6 |
| 5,027,079 A | 6/1991 | Desurvire et al. | |
| 5,036,025 A | 7/1991 | Lin | |
| 5,039,631 A | 8/1991 | Krashkevich et al. | |
| 5,067,789 A | 11/1991 | Hall et al. | |
| 5,173,456 A | 12/1992 | Hayden et al. | |
| 5,259,046 A | 11/1993 | DiGiovanni et al. | |
| 5,274,734 A | * 12/1993 | Jin et al. | 385/142 |
| 5,278,850 A | 1/1994 | Ainslie et al. | |
| 5,285,518 A | 2/1994 | Elyamani et al. | |
| 5,330,940 A | 7/1994 | Aitken et al. | |
| 5,346,868 A | 9/1994 | Eschner | |
| 5,346,870 A | 9/1994 | Noguchi et al. | |
| 5,412,672 A | 5/1995 | Ainslie et al. | |
| 5,413,917 A | 5/1995 | Malloy et al. | |
| 5,513,033 A | * 4/1996 | Bricheno et al. | 359/341.1 |
| 5,599,753 A | 2/1997 | Watzke et al. | |
| 5,610,108 A | 3/1997 | Watzke et al. | |
| 5,631,195 A | 5/1997 | Yanagisawa et al. | |
| 5,747,396 A | 5/1998 | Miyakoshi et al. | |
| 5,747,397 A | 5/1998 | McPherson et al. | |
| 5,780,373 A | 7/1998 | Yanagisawa et al. | |
| 5,838,487 A | 11/1998 | Nilsson et al. | |
| 5,854,871 A | * 12/1998 | Akasaka | 385/123 |
| 5,881,197 A | 3/1999 | Dong et al. | |
| 5,973,824 A | 10/1999 | Sanghera et al. | |
| 6,055,353 A | * 4/2000 | Aiso | 385/123 |
| 6,081,369 A | 6/2000 | Waarts et al. | |
| 6,243,196 B1 | 6/2001 | Endo et al. | |
| 6,292,292 B1 | * 9/2001 | Garito et al. | 359/341.5 |
| 6,620,748 B1 | * 9/2003 | Sugimoto et al. | 501/64 |
| 2002/0003937 A1 | 1/2002 | Asio | |

* cited by examiner

HIGH ABSORPTION ERBIUM DOPED AMPLIFYING OPTICAL FIBER

CROSS REFERENCE TO RELATED APPLICATIONS

This application claims the benefit of priority under 35 U.S.C. 119(e) of U.S. Provisional Patent Application serial No. 60/309,606, filed on Aug. 2, 2001, the content of which is incorporated herein by reference in its entirety.

BACKGROUND OF THE INVENTION

1. Field of the Invention

The present invention is directed to an optical waveguide amplifier for use in telecommunication systems and more particularly, an optical waveguide amplifying fiber providing high absorption and efficiency.

2. Technical Background

The continuous growth of bandwidth requirements in optical-based communication systems has resulted in a large demand for systems able to operate within several optical wavelength ranges including the S-band optical range, the C-band optical range and the L-band optical range. The S-band is typically defined as the wavelengths between about 1465 nm and about 1525 nm, which lies below the C-band wavelength range which extends between about 1525 nm and about 1570 nm, which in turn lies just below the L-band wavelength range which extends between about 1570 nm and 1605 nm. In order to meet this explosive growth and demand for capacity in fiber optic transmission systems, system designers have begun to investigate those spectral regions lying beyond the conventional or C-band transmission band, including the aforementioned S-band and L-band wavelength ranges.

Erbium-doped fiber amplifiers are used to provide amplification in optical transmission systems, and particularly for deployment within those systems operating within the C-band wavelength range. Application of erbium doped fiber amplifiers within the telecommunication systems operating within the L-band wavelength range can be problematic in that lower excited-state population inversions are necessary to provide sufficiently flat gain spectra across the L-band wavelength range. Thus, longer lengths of fiber within the erbium doped fiber amplifier or higher erbium concentrations therein are necessary to provide the same gain which would be provided within a given erbium doped fiber amplifier operating within the C-band wavelength range.

The longer lengths of fiber required in erbium doped fiber amplifiers utilized within the L-band wavelength range results in a decrease in fiber efficiency and an increase in noise when compared with erbium doped fiber amplifiers. In addition, non-linear effects such as four-wave mixing and cross talk modulation are more severe. Typically, the effective areas of erbium doped fiber amplifiers are increased in an attempt to improve the "linearity" of the erbium doped fiber amplifiers. The reasoning for this approach has been that an increase in the effective area spreads out the optical power being transmitted through the doped region of the associated erbium doped fiber amplifier, thereby reducing the intensity of the optical power at any given point. This, in turn, yields an erbium doped fiber amplifier exhibiting more linear material behavior.

The spectroscopy of erbium within L-band erbium doped fiber amplifiers thus poses several challenges with respect to designing the fiber amplifier to be used therein. These challenges include: (1) packaging amplifier modules with longer fiber lengths, as required by the lower differential gain while controlling fiber bend loses at longer wavelengths, (2) maintaining a high absorption rate without significantly increasing concentration quenching, (3) minimizing non-linear effects such as two-channel four-wave mixing and cross-phase modulation in the amplifier, and (4) minimizing the intrinsically higher L-band noise figure.

SUMMARY OF THE INVENTION

This invention relates to an optical waveguide fiber amplifier that effects amplification of an optical signal within the L-band optical wavelength range. More specifically, the invention relates to a high efficiency optical waveguide amplifier operating in the L-band optical wavelength range providing reduced non-linearity effects and a reduced noise figure.

In a first embodiment, an optical waveguide fiber comprises a core region having a relative refractive index percent and an outer radius, wherein the core region, at least in part, comprises $Er_2O_3$ within the range of from about 1300 wt.ppm to about 3600 wt.ppm, $Al_2O_3$ within the range of from about 6.0 wt. % to about 10.0 wt. % and $GeO_2$ within the range of from about 9.0 wt. % to about 20.0 wt. %. The optical waveguide fiber also comprises an inner clad surrounding the core region and having a relative refractive index percent and an outer radius, and an outer clad surrounding the inner clad and having a relative refractive index percent. The relative refractive index percentages and radii of the core region, the inner clad and the outer clad are chosen from the following ranges: the relative refractive index percent of the core segment within the range of from about 0.5% to about 2%; the relative refractive index percent of the inner clad within the range of from about 0.0% to about 0.4%; the outer radius of the core region within the range of from about 0.7 $\mu$m to about 1.6 $\mu$m; and, the outer radius of the inner clad within the range of from about 4.3 $\mu$m to about 18.8 $\mu$m.

In a second embodiment, an optical waveguide fiber comprises a core region having a refractive index profile and, at least in part, comprises $Er_2O_3$ within the range of from about 1300 wt.ppm to about 3600 wt.ppm, $Al_2O_3$ within the range of from about 6.0 wt. % to about 10.0 wt. % and $GeO_2$ within the range of from about 9.0 wt. % to about 20.0 wt. %. The optical waveguide fiber also comprises an inner clad surrounding the core region and having a refractive index profile, and an outer clad surrounding the inner clad and having a refractive index profile. The amounts of $Er_2O_3$, $Al_2O_3$ and $GeO_2$ within the core region and the refractive index profiles of the core region, the inner clad and the outer clad are selected to provide a mode field diameter of greater than or equal to about 5.2 $\mu$m at a wavelength of about 1550 nm.

The present invention also includes optical communication systems employing the optical waveguide fibers and optical waveguide fiber amplifiers in accordance with the embodiments described above.

Additional features and advantages of the invention will be set forth in the detailed description which follows and will be apparent to those skilled in the art from the description or recognized by practicing the invention as described in the following description together with the claims and appended drawings.

BRIEF DESCRIPTION OF THE DRAWINGS

The accompanying drawings are included to provide a further understanding of the invention and are incorporated and constitute part of the specification. The drawings illustrate various features and embodiments of the invention which, together with their description, serve to explain the principles and operation of the invention.

DEFINITIONS

Figure 1:
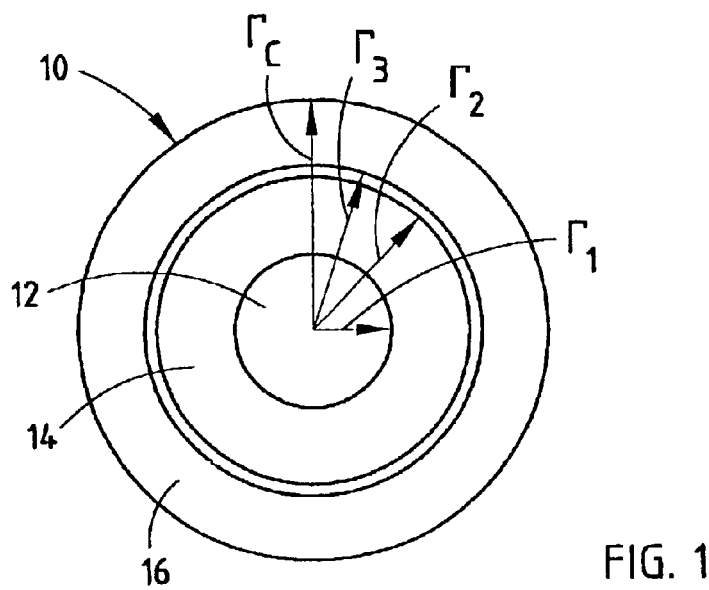
FIG. 1 is a schematic cross-sectional view of a novel optical waveguide amplifying fiber embodying the present invention.

The following definitions and terminology are commonly used in the art:

The radii of the segments of the core is defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius of the waveguide center line to the location of its first refractive index point is the inner radius of that segment. Likewise, the radius from the waveguide center line to the location of the last refractive index point of the segment is the outer radius of that segment.

The segment radii may be conveniently defined in a number of ways. In this application, radii are defined in accord with the figures, described in detail below.

The definitions of segment radius and refractive index, used to describe refractive index profile, in no way limit the invention.

The effective area is generally defined as, $$A_{eff} = 2\pi (\int E^2 r dr)^2 / (\int E^4 r dr),$$

wherein the integration limits are 0 to $\infty$, and E is the electric field associated with the propagated light.

The mode field diameter, $D_{mf}$, is measured using the Peterman II method wherein, $2w = D_{mf}$ and $w^2 = (2\int E^2 r dr / \int [dE/dr]^2 r dr)$, the integration limits being 0 to $\infty$.

The relative refractive index of a segment, $\Delta$ %, as used herein, is defined by the equation, $$\Delta\% = 100 \times (n_i^2 - n_c^2)/n_c^2,$$

where $n_1$ is the maximum refractive index of the index profile segment denoted as i, and $n_c$, the reference refractive index, is taken to be the refractive index of the clad layer. Every point in the segment has an associated relative index. The maximum relative index is used to conveniently characterize a segment whose general shape is known.

The term refractive index profile or index profile is the relation between $\Delta\%$ or refractive index and radius over a selected segment of the core.

Total dispersion is defined as the algebraic sum of waveguide dispersion and material dispersion. Total dispersion is also referred to as chromatic dispersion in the art.

Total background loss is defined as all optical loss not attributable to absorption from the $^4I_{13/2}$ to the $^4I_{15/2}$ erbium transition, including scattering, host glass absorption, bend loss, concentration quenching effects, Hawking radiation, and similar phenomena.

Cut-off wavelength, as defined herein, is the coiled cut-off wavelength measured via the Telecommunications Industry Association/Electronic Industry Alliance standard test procedure (TIA/EIA-455-80B) as included within Recommended Standard, wherein the large bend diameter is 32 mm and the small bend diameter is 8 mm.

The nonlinear process of four-wave mixing within erbium doped fiber amplifiers is generally approximated herein as, $$P_{FWM} * n(\Delta k) \cdot |x^{(3)}|^2 P_1 P_2 P_3^* \cdot l^2 \propto \frac{l^2}{A_{eff}^2},$$

where $P_{FWM}$ is the power of the mixing tones, n is the four-wave mixing power conversion efficiency, $\Delta k$ is the phase matching of the signals, $A_{eff}$ is the effective area of the fiber amplifier, X is the peak signal power density, $P_1 P_2 P_3^*$ are the power of the signals, and l is the effective interaction length of the signals. The phase matching $n(\Delta k)$ is determined by chromatic dispersion along the fiber.

Two-toned, four-wave mixing power conversion frequency is defined as the ratio of the output power in a four-wave mixing side band channel to the input in one of the two signal channels.

The overlap of an optical waveguide fiber is generally defined as the proportion of the guided light within the fiber that interacts with a particular segment, such as an erbium doped core region or segment.

DETAILED DESCRIPTION OF THE PREFERRED EMBODIMENTS

Reference will now be made in detail to the present preferred embodiments of the invention, examples of which are illustrated in the accompanying drawings. An exemplary embodiment of the segmented core refractive index profile of the present inventive optical waveguide fiber amplifier is shown in the figures.

The optical waveguide amplifying fiber described and disclosed herein has a generally segmented structure, as shown in FIG. 1. Each of the segments is described by a refractive index profile, relative refractive index percent, $\Delta_i$, and an outside radius, $r_1$. The subscript i for the r and $\Delta$ refers to a particular segment. The segments are numbered $r_1$ through $r_c$ beginning with the innermost segment which includes the waveguide longitudinal axis center line. A clad layer having a refractive index of $n_c$ surrounds the optical waveguide fiber. In the illustrated example, an optical waveguide amplifying fiber 10 includes a core region or segment 12 having an outer radius $r_1$, an inner clad 14 having an outer radius $r_2$ and an outer clad 16 having an outer radius $r_c$.

Figure 2:
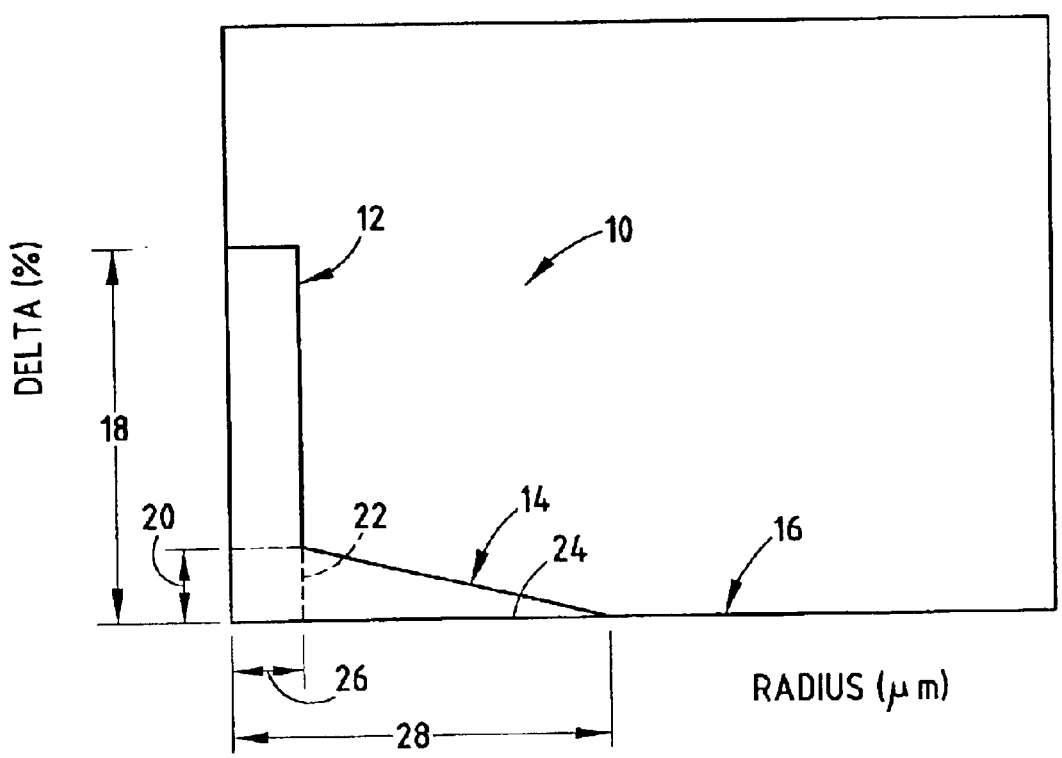
FIG. 2 is a diagram of a waveguide refractive index profile of the optical waveguide amplifying fiber.

A general representation of the core refractive index profile of fiber 10 is illustrated in FIG. 2, which shows relative refractive index percent charted versus the waveguide fiber amplifier radius. Although FIG. 2 shows only three discreet segments, it is understood that the functional requirements may be met by forming an optical waveguide fiber amplifier having more than three segments. However, embodiments having fewer segments are usually easier to manufacture and are therefore preferred. Further, the illustrated core index profile has a step index region, however, other indices may be utilized.

The fiber 10 may be constructed via a variety of methods including, but in no way limited to, vapor axial deposition (VAD), modified chemical vapor deposition (MCVD) and outside vapor deposition (OVD). Fiber 10 is preferably constructed via an OVD process.

The core region 12 of optical waveguide fiber 10 is composed of a silica based glass and is at least in part comprised of $Er_2O_3$, preferably within the range of from about 1300 wt.ppm to about 3600 wt.ppm, more preferably within the range of from about 1950 wt.ppm to about 3100 wt.ppm, and most preferably within the range of from about 2200 wt.ppm to about 3000 wt.ppm. Core region 12 also comprises at least in part $Al_2O_3$ within the range of from about 6.0 wt. % to about 10.0 wt. %, more preferably within the range of from about 6.5 wt. % to about 9.5 wt. %, and most preferably within the range of from about 7 wt. % to about 9.0 wt. %. Core region further comprises at least in part $GeO_2$ within the range of from about 9.0 wt. % to about 20.0 wt. %, more preferably within the range of from about 9.0 wt. % to about 16.0 wt. %, and most preferably within the range of from about 10 wt. % to about 14 wt. %.

The inner clad 14 of fiber 10 is preferably comprised of a silica based glass doped with $GeO_2$ such that the refractive index profile of inner clad 14 decreases linearly as the radius increases. The outer clad 16 comprises undoped silica having a relative refractive index of about 0%.

The core region 12 of fiber 10 has a relative refractive index percent 18, $\Delta_1$, within the range of from about 0.5% to about 2%, more preferably within the range of from about 1.3% to about 1.7%, and most preferably within the range of from about 1.4% to about 1.6%. Core region 12 also has an outer radius 26, $r_1$, within the range of from about 1.0 μm to about 2.5 μm, more preferably within the range of from about 1.25 μm to about 2.25 μm, even more preferably within the range of from about 1.4 μm to about 1.9 μm, and most preferably within the range of from about 1.45 μm to about 1.6 μm. The radius 26, $r_1$, is defined as the mid-point of the most positive point or points of the refractive index profile of core region 12, along the decreasing slope of the index profile of core 12.

The inner clad 14 of fiber 10 has a relative refractive index percent 20, $\Delta_2$, within the range of from about 0.0% to about 0.4%, more preferably within the range of from about 0.05% to about 0.4%, and most preferably within the range of from about 0.1% to about 0.3%. Inner clad 14 also has an inner radius 27 (FIG. 3), $r_2$, within the range of from about 1.5 μm to about 2.0 μm, more preferably within the range of from about 1.6 μm to about 1.9 μm, and most preferably within the range of from about 1.69 μm to about 1.8 μm. The inner radius 27, $r_2$, is the intersection of core region 12 and inner clad 14. Inner clad 14 further has an outer radius 28, $r_3$, within the range of from about 4.3 μm to about 18.8 μm, more preferably within the range of from about 8.0 μm to about 16.0 μm, and most preferably within the range of from about 11.6 μm to about 14.7 μm. The radius 28, $r_3$, is the intersection of inner clad 14 and outer clad 16 which in the preferred embodiment is undoped silica. In this case the intersection point is defined as the intersection of the profile of the inner clad 14 with the horizontal axis 24. The outer radius 28 of inner clad 14 is also the inner radius of the outer clad 16. The outer clad 16 surrounds inner clad 14 and has a relative refractive index percent, $n_c$, of approximately 0%, and an outer radius of approximately 62.5 μm.

Figure 3:
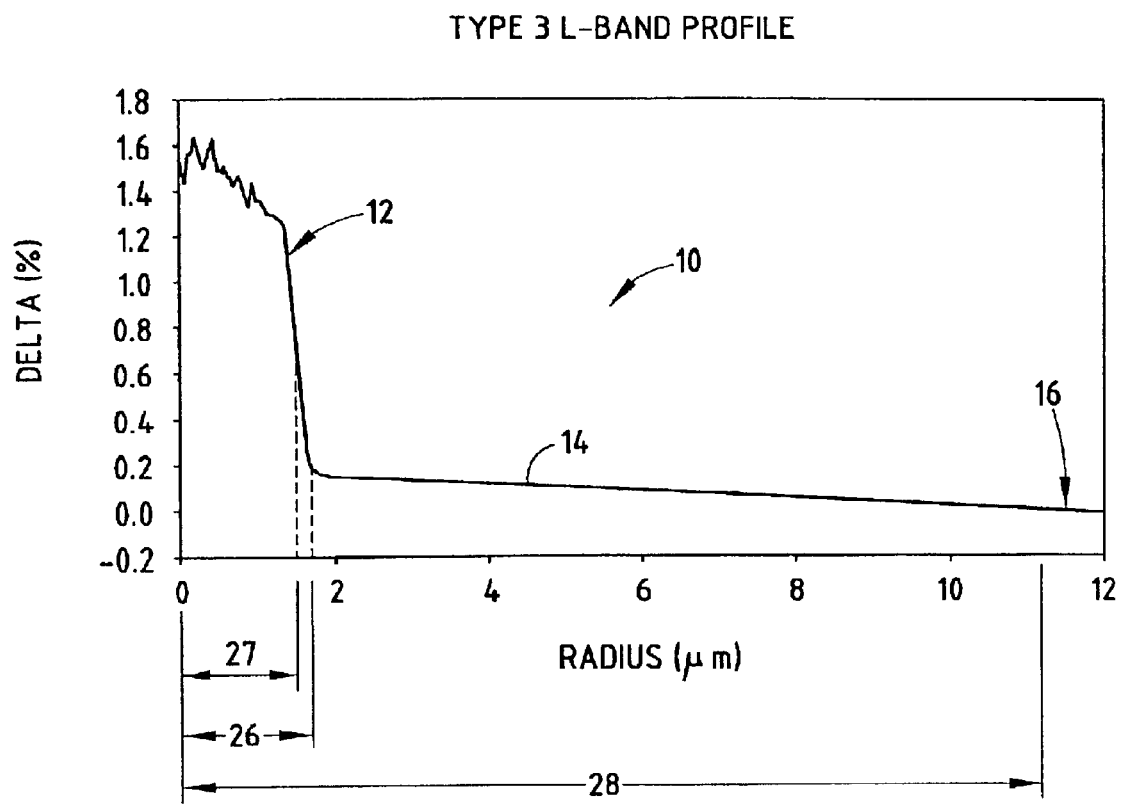
FIG. 3 is a diagram of a waveguide refractive index profile of a preferred embodiment of the optical waveguide amplifying fiber.

The optical waveguide fiber 10, as shown in FIG. 3, exhibits optical properties, including: an effective area within the range of from about 20.0 μm² to about 45.0 μm² at a wavelength of 1565 nm, more preferably within the range of from about 20.0 μm² to about 30.0 μm² at a wavelength of 1565 nm, and most preferably within the range of from about 20.0 μm² to about 26.0 μm² at a wavelength of 1565 nm; a mode field diameter within the range of from about 4.8 μm to about 6.5 μm at a wavelength of 1550 nm, more preferably within the range of from about 5.0 μm to about 6.0 μm at a wavelength of 1550 nm, and most preferably within the range of from about 5.2 μm to about 5.8 μm; and, a cut-off wavelength within the range of from about 950 nm to about 1500 nm, more preferably within the range of from about 980 m to about 1480 nm, and most preferably within the range of from about 1250 nm to about 1400 run. In addition, optical waveguide fiber 10 exhibits optical properties, including a polarization mode dispersion within the range of from about 0 fs/m and 5 fs/m at a wavelength of 1590 nm, and more preferably less than about 1 fs/m at a wavelength of 1590 nm; a peak absorption within the range of from about 20 dB/m and 39 dB/m, more preferably within the range of from about 20 dB/m and 30 dB/m, and most preferably within the range of from about 21 dB/m and 29 dB/m; and a total background loss preferably within the range of from about 0% to about 5%, more preferably within the range of from about 0% to about 3%, and most preferably within the range of from about 0% to about 2.5%, relative to absorption at all wavelengths. The fiber 10 further exhibits a bend loss of less than or equal to about 0.01 dB/m on a 32 mm diameter coil.

Figure 4:
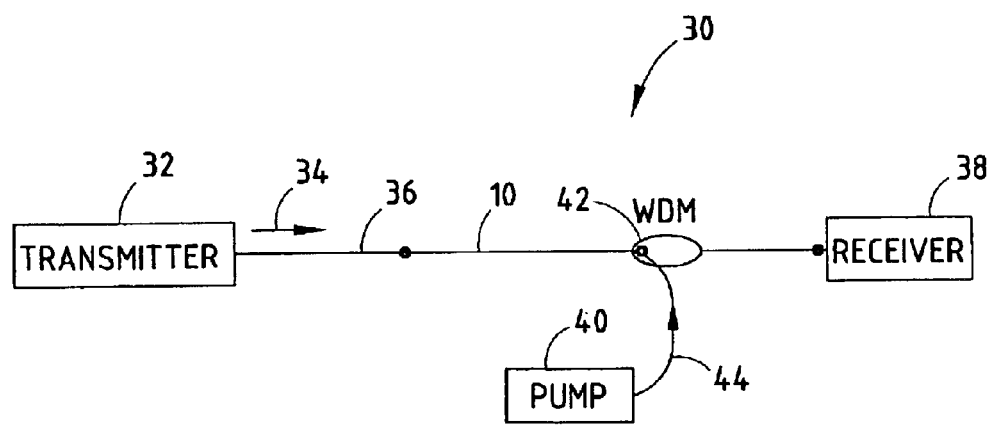
FIG. 4 is a schematic view of a fiber optic communication system employing the optical waveguide amplifying fiber of the present invention.

The optical waveguide amplifying fiber 10 is manufactured in accordance with the present invention may be used in an optical fiber communication system 30, as shown in FIG. 4. System 30 includes an optical transmitter 32 adapted to transmit an optical signal in a direction indicated by arrow 34 through an optical waveguide transmission fiber 36 which is in optical communication with transmitter 32. System 30 also includes the optical waveguide amplifying fiber 10 in optical communication with transmission fiber 36 and an optical receiver 38 adapted to receive the optical signal 34. Fiber 10 may be employed within system 30 in a coil form, within a box, or in any other form or packaging as known in the art. The transmission system 30 further includes an optical pump 40 in optical communication with fiber amplifier 10 via an optical coupler 42 such as a wave division multiplexer, and which is adapted to supply a pump radiation indicated by an arrow 44 to fiber amplifier 10. In most systems, both ends of transmission fiber 36 and fiber 10 will be capable two-way signal transmission, and transmitter 32 and receiver 38 are shown for illustration only.

The present inventive optical waveguide fiber amplifier 10 is highly efficient, thereby allowing for a reduction in the overall length of the amplifier fiber required to provide a sufficient amount of gain. This decrease in overall length results in a reduction in the non-linearity effects such as two-channel four-wave mixing and cross-talk introduced into a transmission signal by the amplifier, and also reduces the associated noise-factor.

It will become apparent to those skilled in the art that various modifications to the preferred embodiment of the invention as described herein can be made without departing from the spirit or scope of the invention as defined by the appended claims.

It is to be understood that the foregoing description is exemplary of the invention only and is intended to provide an overview and an understanding of the nature and character of the invention as it is defined in the claims.

The invention claimed is:

1. An optical waveguide fiber, comprising:
   a core region having a relative refractive index percent and an outer radius, the core region at least in part comprising $Er_2O_3$ within a range of from about 1300 wt.ppm to about 3600 wt.ppm, $Al_2O_3$ within a range of from about 6.0 wt. % to about 10.0 wt. % and $GeO_2$ within a range of from about 9.0 wt. % to about 20.0 wt. %;

an inner clad surrounding the core region and having a relative refractive index percent and an outer radius; and an outer clad surrounding the inner clad and having a relative refractive index percent;

wherein the relative refractive index percentages and radii of the core region, the inner clad and the outer clad are chosen from the following ranges:

the relative refractive index percent of the core segment within the range of from about 0.5% to about 2.0%;

the relative refractive index percent of the inner clad within the range of from about 0.0% to about 0.4%;

the outer radius of the core region within the range of from about 0.7 µm to about 1.6 µm; and the outer radius of the inner clad within the range of from about 4.3 µm to about 18.8 µm.

2. The fiber of claim 1, wherein the amount of $Er_2O_3$ within the core region is within the range of from about 1950 wt.ppm to about 3100 wt.ppm.

3. The fiber of claim 1, wherein the amount of $Al_2O_3$ within the core region is within the range of from about 6.5 wt. % to about 9.5 wt. %.

4. The fiber of claim 1, wherein the amount of $GeO_2$ within the core region is within the range of from about 9.0 wt. % to about 16.0 wt. %.

5. The fiber of claim 1, wherein the relative refractive index percentages and radii of the core region, the inner clad and the outer clad, and the amounts of the $Er_2O_3$, $Al_2O_3$ and $GeO_2$ in the core region are selected to provide a mode field diameter of greater than or equal to 5.2 µm at a wavelength of 1550 nm.

6. The fiber of claim 5, wherein the relative refractive index percentages and radii of the core region, the inner clad and the outer clad, and the amounts of the $Er_2O_3$, $Al_2O_3$ and $GeO_2$ in the core region are selected to provide a mode field diameter within the range of from about 5.2 µm to about 5.8 µm at a wavelength of 1550 nm.

7. The fiber of claim 1, wherein the relative refractive index percentages and radii of the core region, the inner clad and the outer clad, and the amounts of the $Er_2O_3$, $Al_2O_3$ and $GeO_2$ in the core region are selected to provide a peak absorption value of less than or equal to about 36 dB/m within a wavelength band of between about 1450 nm and about 1620 nm.

8. The fiber of claim 1, wherein the relative refractive index percentages and radii of the core region, the inner clad and the outer clad, and the amounts of the $Er_2O_3$, $Al_2O_3$ and $GeO_2$ in the core region are selected to provide a peak absorption value of less than or equal to about 27 dB/m within a wavelength band of between about 1450 nm and about 1620 nm.

9. The fiber of claim 1, wherein the fiber exhibits a polarization mode dispersion of less than or equal to about 5 fs/m at a wavelength of 1590 nm.

10. The fiber of claim 1, wherein the relative refractive index percentages and radii of the core region, the inner clad and the outer clad, and the amounts of the $Er_2O_3$, $Al_2O_3$ and $GeO_2$ in the core region are selected to provide a total background loss relative to absorption of less than or equal to about 2.5% at a wavelength of 1480 nm.

11. The fiber of claim 1, wherein the relative refractive index percentages and radii of the core region, the inner clad and the outer clad, and the amounts of the dopants in the core region are selected to provide a cut-off wavelength of less than or equal to about 1400 nm.

12. The fiber of claim 11, wherein the relative refractive index percentages and radii of the core region, the inner clad and the outer clad, and the amounts of the dopants in the core region are selected to provide a cut-off wavelength of less than or equal to about 1350 nm.

13. The fiber of claim 12, wherein the relative refractive index percentages and radii of the core region, the inner clad and the outer clad, and the amounts of the dopants in the core region are selected to provide a cut-off wavelength of less than or equal to about 1000 nm.

14. The fiber of claim 1, wherein a gain is greater than or equal to about 19.5 dB for two adjacent input channels having about 100 GHz separation therebetween, and wherein a two-tone four-wave mixing conversion efficiency multiplied by an effective area of the fiber squared and divided by a length of the amplifier fiber squared, is less than or equal to about 0.01 $mm^4/m^2$.

15. An optical fiber communication system, comprising:
an transmitter adapted to transmit an optical signal;
an optical waveguide transmission fiber in optical communication with the transmitter;
the optical waveguide fiber of claim 1 in optical communication with the optical waveguide transmission fiber;
at least one optical pump in optical communication with the optical waveguide fiber amplifier and adapted to supply a pump radiation thereto; and
a receiver adapted to receive the optical signal.

16. An optical waveguide fiber, comprising:
a core region having a refractive index profile and at least in part comprising $Er_2O_3$ within a range of from about 1300 wt.ppm to about 3600 wt.ppm, $Al_2O_3$ within a range of from about 6.0 wt. % to about 10.0 wt. % and $GeO_2$ within a range of from about 9.0 wt. % and about 20.0 wt. %;
an inner clad surrounding the core region and having a refractive index profile; and
an outer clad surrounding the inner clad and having a refractive index profile;
wherein the amounts of $Er_2O_3$, $Al_2O_3$ and $GeO_2$ within the core region and the refractive index profiles of the core region, the inner clad and the outer clad are selected to provide a mode field diameter of greater than or equal to about 5.2 µm at a wavelength of 1550 nm.

17. The fiber of claim 16, wherein the amounts of $Er_2O_3$, $Al_2O_3$ and $GeO_2$ within the core region and refractive index profiles of the core region, the inner clad and the outer clad are selected to provide a cut-off wavelength of less than or equal to about 1400 nm.

18. The fiber of claim 17, wherein the amounts of $Er_2O_3$, $Al_2O_3$ and $GeO_2$ within the core region and refractive index profiles of the core region, the inner clad and the outer clad are selected to provide a cut-off wavelength of less than or equal to about 1350 nm.

19. The fiber of claim 16, wherein the amounts of $Er_2O_3$, $Al_2O_3$ and $GeO_2$ within the core region and refractive index profiles of the core region, the inner clad and the outer clad are selected to provide a cut-off wavelength of less than or equal to about 980 nm.

20. The fiber of claim 16, wherein the fiber exhibits a polarization mode dispersion of less than or equal to about 5 fs/m at a wavelength of 1590 nm.

21. The fiber of claim 16, wherein the amounts of $Er_2O_3$, $Al_2O_3$ and $GeO_2$ within the core region and refractive index profiles of the core region, the inner clad and the outer clad are selected to provide a peak absorption of less than or equal to about 36 dB/m within a wavelength band of between 1450 nm and 1620 nm.

22. The fiber of claim 16, wherein the amounts of $Er_2O_3$, $Al_2O_3$ and $GeO_2$ within the core region and refractive index profiles of the core region, the inner clad and the outer clad are selected to provide a mode field diameter of less than or equal to about 5.8 μm at a wavelength of 1550 nm.

23. The fiber of claim 22, wherein the amounts of $Er_2O_3$, $Al_2O_3$ and $GeO_2$ within the core region and refractive index profiles of the core region, the inner clad and the outer clad are selected to provide a mode field diameter within the range of about 5.2 μm to about 5.8 μm at a wavelength of 1550 nm.

24. The fiber of claim 16, wherein the amounts of $Er_2O_3$, $Al_2O_3$ and $GeO_2$ within the core region and refractive index profiles of the core region, the inner clad and the outer clad are selected to provide an effective area of greater than or equal to about 20 μm².

25. The fiber of claim 16, wherein the amount of $Er_2O_3$ within the core region is within the range of from about 1950 wt.ppm to about 3100 wt.ppm.

26. The fiber of claim 16, wherein the amount of $Al_2O_3$ within the core region is within the range of from about 6.5 wt. % to about 9.5 wt. %.

27. The fiber of claim 16, wherein amount of $GeO_2$ within the core region is within the range of from about 9.0 wt. % to about 16.0 wt. %.

28. The fiber of claim 16, wherein a gain is greater than or equal to about 19.5 dB for two adjacent input channels having about 100 GHz separation therebetween, and wherein a two-tone four-wave mixing conversion efficiency multiplied by a effective area of the fiber squared and divided by a length of the amplifier fiber squared, is less than or equal to about 0.01 mm⁴/m².

\* \* \* \* \*